United States Patent [19]

Beckloff et al.

[11] Patent Number: 5,015,805
[45] Date of Patent: May 14, 1991

[54] KELLEMS GRIP CONSTRUCTION FOR CABLE CONNECTOR AND METHOD OF USING SAME

[75] Inventors: Dennis M. Beckloff, Chesapeake, Va.; David L. Culberston, New London, Conn.

[73] Assignee: The United States of America as represented by the Secretary of the Navy, Washington, D.C.

[21] Appl. No.: 501,916

[22] Filed: Mar. 29, 1990

[51] Int. Cl.$^5$ .......................................... H02G 15/02
[52] U.S. Cl. ................................. 174/75 C; 29/857; 174/78; 174/79; 174/88 C; 174/89; 403/291
[58] Field of Search ............... 174/75 C, 78, 79, 88 C, 174/89; 29/857, 858; 403/291

[56] References Cited

U.S. PATENT DOCUMENTS

| | | | |
|---|---|---|---|
| 3,280,246 | 10/1966 | Lawson et al. | 174/78 |
| 3,294,894 | 12/1966 | Stillman, Jr. | 174/79 |
| 3,517,375 | 6/1970 | Mancini | 174/78 |
| 4,174,463 | 11/1979 | Albert, Jr. | 174/79 |
| 4,331,374 | 5/1982 | Phillips | 174/75 C X |
| 4,601,507 | 7/1986 | Fallon | 24/115 N X |

*Primary Examiner*—Morris H. Nimmo
*Attorney, Agent, or Firm*—Michael J. McGowan; Prithvi C. Lall

[57] ABSTRACT

In providing a coaxial cable having reinforcing strands with a Kellems grip connector, a length of the outer sheath is initially removed to expose the core, reinforcing strands and metallic braid. The exposed strands are formed into a multiplicity of bundles which are initially folded away from the end of the cable, and a metallic washer is placed over the exposed core and conductively bonded to the metallic braid. A Kellems grip connector having a connector element and a cylindrical mesh compression sleeve is inserted onto the core, and the sleeve extends over the washer and the strands. The washer is conductively connected to the connector of the Kellems grip connector which is spaced closely thereto. The bundles of strands are pulled outwardly through peripherally spaced openings in the mesh sleeve and looped about the intersections of the wires of the sleeve adjacent the connector. The bundles are then fed axially under the mesh sleeve towards the other end thereof and again looped around a peripherally spaced intersection of the wires of the mesh sleeve to firmly engage the reinforcing strands with the mesh sleeve. Thereafter, an insulating covering of resin is molded about the end of the cable so as to provide protective outer sheath to the connector itself.

13 Claims, 4 Drawing Sheets

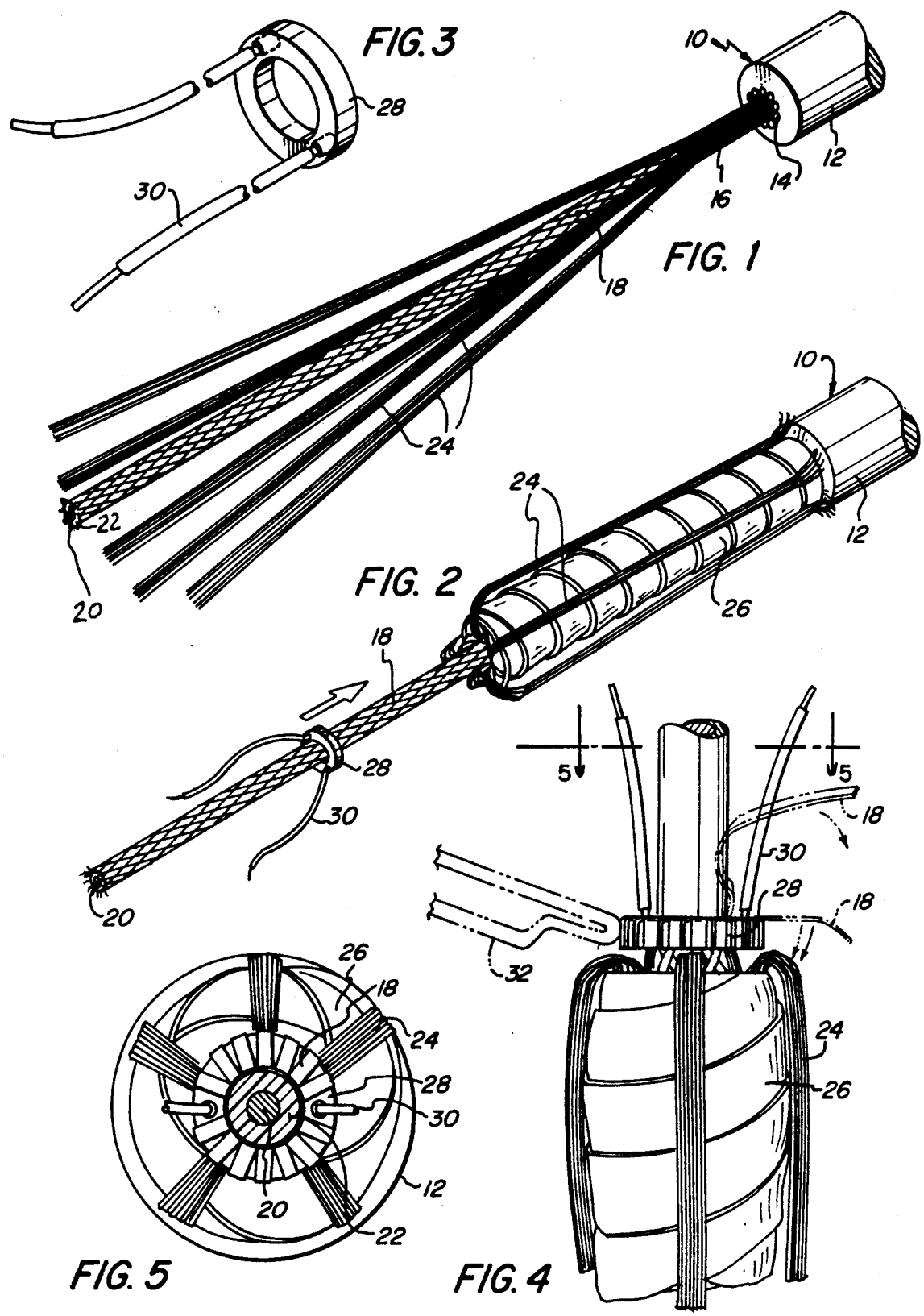

KELLEMS GRIP CONSTRUCTION FOR CABLE CONNECTOR AND METHOD OF USING SAME

STATEMENT OF GOVERNMENT INTEREST

The invention described herein may be manufactured and used by or for the Government of the United States of America for Governmental purposes without the payment of any royalties thereon or therefor.

This patent application is co-pending with a related application Ser. No. 07/501,912 filed Mar. 29, 1990 entitled "Jig for Making Improved Kellems Grip Construction for Cable Connector and Method of Using Same" by the same inventors filed on the same date as this patent application.

BACKGROUND OF THE INVENTION (1) Field of the Invention

The present invention relates to cable connectors and more particularly to an improved method for assembling a Kellems grip connector on coaxial cable.

(2) Description of the Prior Art

In a number of applications, there is a need to provide a high mechanical strength joint between the connector and coaxial cable as well as to provide good electrical properties at the joint. More particularly, it is desirable to maintain the strength of the cable itself to the point of the connector and to continue the shielding capability provided within the cable to the connector. Lastly, where the cable will be exposed to a hostile environment such as by immersion in salt water, it is desirable that the cable area adjacent the connector be substantially impervious to the environment.

To provide high mechanical strength connections between the connector and the cable, Kellems grip connectors are frequently employed. In such connectors, the connector element has attached thereto a wire mesh cylindrical sleeve which extends over the cable core. As is known, this type of sleeve will compress when it is stretched, and a tension load on the end of the cable near the connector will produce stretching and thereby increase the clamping action of the Kellems grip sleeve upon the underlying cable material. The use of such compression sleeves is described in the patent literature, including Crowl U.S. Pat. No. 3,622,685 and Zehren U.S. Pat. No. 4,296,548.

In some cables, axially extending reinforcing strands of high strength synthetic resin are employed to increase the overall strength of the cable and to limit its elongation.

SUMMARY OF THE INVENTION

It is an object of the present invention to provide a novel method for securing a Kellems grip connector at the end of a coaxial cable to provide enhanced strength and effectively preserve the shielding provided by the metallic braid.

It is also an object to provide such a method which can be accomplished relatively easily by interengagement of the reinforcing strands in the cable and the Kellems grip sleeve.

Another object is to provide a cable having such an improved Kellems grip connection at its end and which will exhibit long life and high strength.

It has now been found that the foregoing and related objects may be readily attained in a method for assembling a Kellems grip connector on a coaxial cable having a conductive core, a metallic braid thereabout, synthetic resin reinforcing strands outwardly of the braid and an outer sheath. A length of the outer sheath extending inwardly from the end cable is removed to expose the metallic braid and reinforcing strands, and the exposed strands are formed into a multiplicity of bundles spaced about the periphery of the core. These bundles are folded upon themselves to extend away from the end of the cable. A metallic washer is placed over the exposed core and the metallic braid is conductively bonded thereto.

There is then slid over the exposed core a Kellems grip connector having a connector element at its outer end and a cylindrical mesh compression sleeve formed by interlaced wires, and this mesh sleeve extends over the washer and the bundles of strands. The bundles of reinforcing strands are fed outwardly through peripherally spaced openings in the mesh sleeve adjacent the connector element. Each bundle is looped about a peripherally spaced intersection of the wires of the mesh sleeve adjacent the connector element, and the bundle is then drawn axially under the mesh sleeve towards the end thereof spaced from the connector element. Each bundle is then looped about a peripheral wire of the mesh sleeve adjacent the spaced end thereof. As a result, the bundles of reinforcing strands are firmly interengaged with the mesh sleeve of the Kellems grip connector.

Preferably, the mesh sleeve is initially collapsed in length to effect an expansion in diameter and permit feeding of the bundles therethrough. The sleeve is extended to its full normal length after the bundles are fed therethrough at a point adjacent the metallic washer. The mesh sleeve is desirably comprised of a first section adjacent the connector element having double wires along its length and a second section of single wires adjacent its other end, and the second looping step is effected adjacent the initial end of the second section. Generally, the strands are formed into five bundles and the wire mesh sleeve has five intersections of wires about its periphery.

The method will normally include the step of forming an insulating covering about the exposed sheath and braid between the connector element and ends thereof and to the end of the original outer sheath. This insulating covering is formed from a thermoplastic resin. Generally, the mesh sleeve of the Kellems grip and reinforcing strands are covered with a thermoplastic material, and then the insulating covering and thermoplastic material are molded into a continuous insulating sheath extending from the original outer sheath to the connector element.

Desirably, the metallic washer has hook up wires thereon extending towards the end of the cable, and the hook up wires are conductively connected to the connector element to provide a continuity of the shielding.

The resulting cable connection will include a coaxial cable with a conductive core, a metallic braid thereabout, synthetic resin reinforcing strands outwardly of the braid, and an outer sheath. A conductive washer on the braid is spaced inwardly from an end of the cable, and the braid is conductively coupled to the washer. A Kellems grip connector on the cable has a connector or element at the end of the cable engaged with the core and a cylindrical mesh compression sleeve formed by interlaced wires. The portions of the reinforcing strands adjacent the cable are formed into peripherally spaced bundles which extend axially towards and then away from the washer under the sleeve. These bundles are initially looped about intersections of the wire mesh adjacent the connector element and then extend axially away from the connector element. The bundles are also looped about intersections of the wire sleeve at points spaced from the connector element.

BRIEF DESCRIPTION OF TUE DRAWINGS

FIG. 1 is a fragmentary perspective view of the end of a coaxial cable from which the outer sheath and conductive fillers have been stripped exposing the reinforcing strands and metallic braid about the dielectric covered core;

FIG. 2 is a perspective view showing a portion of the stripped cable covered with a thermoplastic tape extending for a distance from the outer sheath, further showing the reinforcing strands formed as bundles which are folded inwardly over the tape, and lastly showing a metal washer being inserted onto the conductive braid;

FIG. 3 is a perspective view to an enlarged scale of the conductive washer seen in FIG. 2;

FIG. 4 is a fragmentary plan view showing the conductive washer disposed upon the core adjacent the inwardly folded bundles of reinforcing strands and showing in phantom line the tip of a soldering iron being used to solder the metallic braid to the conductive washer;

FIG. 5 is a sectional view along the line 5—5 of FIG. 4;

DESCRIPTION OF THE PREFERRED EMBODIMENT

Figure 6:
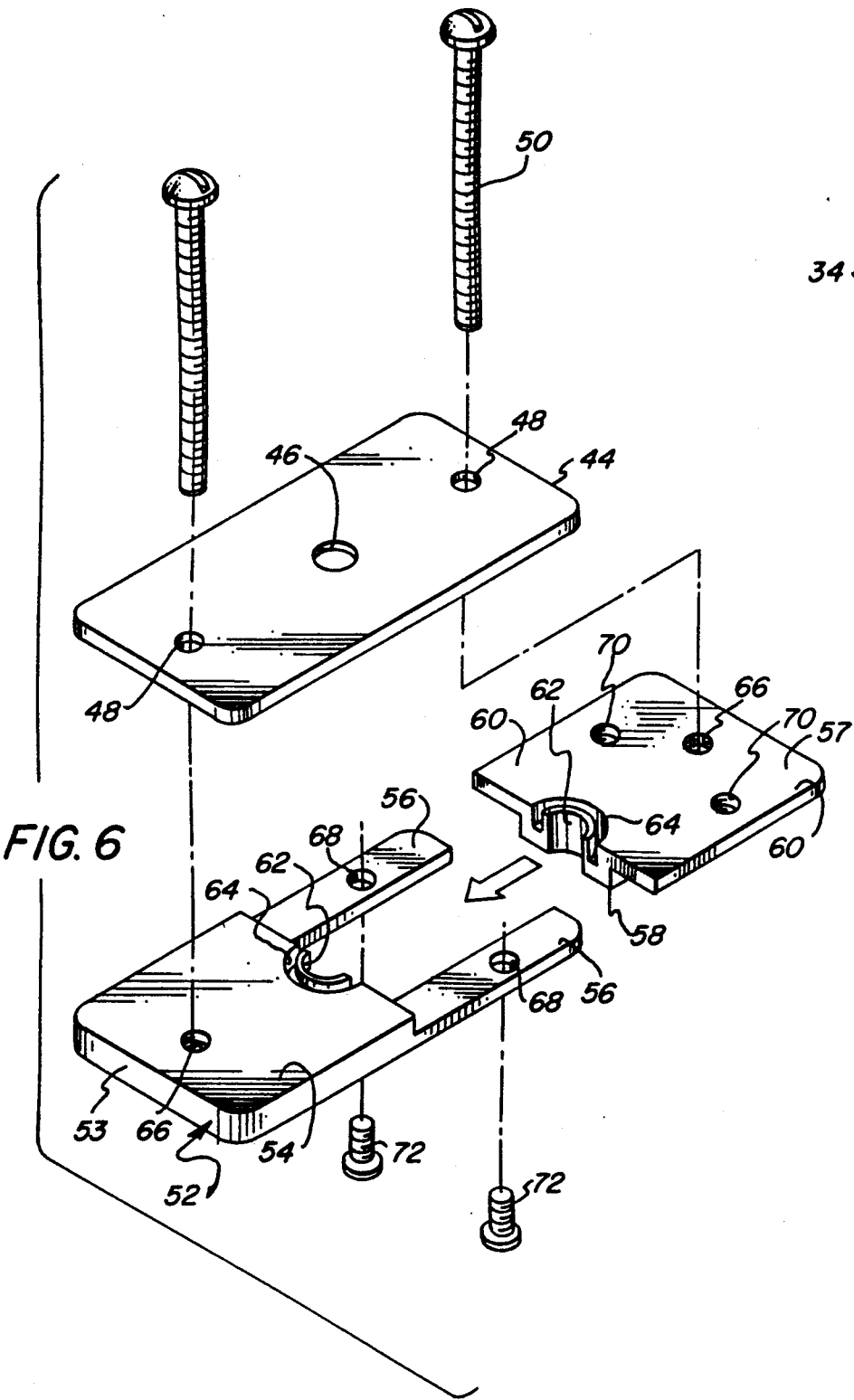
FIG. 6 is an exploded view of a jig desirably utilized in the method of the present invention.

Turning first to FIG. 1 of the drawings, therein illustrated is a coaxial cable of the type with which the present invention is employed, and generally designated by the numeral 10. It includes an outer sheath 12 of durable synthetic resin which contains fillers 14 such as elongated polyolefin elements of circular cross section, reinforcing strands 16 of high tensile strength synthetic resin (such as the aromatic polyamide sold by E. I. duPont deNemours under the trademark KEVLAR), a jacket 18 of copper braid, and a central core wire 20 surrounded by the dielectric resin coating 22. As is well known, it may also contain additional conductors, string to tie elements together, etc.

In FIG. 1, the cable 10 is shown after removing a length of sheath 12 and cutting the fillers 14. The reinforcing strands 16 have also been separated into five peripherally spaced bundles 24.

In FIG. 2, tape 26 of synthetic thermoplastic has been wound about the bundles 24, braid 18 and core 20 for a length substantially equal to the length of the Kellems grip sleeve (not shown), and the bundles 24 have been folded back onto the taped portion. A metallic washer 28 having a pair of hook up wires 30 is shown as fitted over the braided jacket 18, and being moved towards the end of the taped portion.

In FIG. 4, the washer 28 is shown in position and the braided jacket 18 has been fanned out and folded over the periphery of the washer 28. At this point, the braided jacket 18 is soldered to the face and periphery of the washer 28 of FIG. 3 as indicated by the solder iron 32. The excess braided jacket 18 is thereafter trimmed, and the resultant structure is seen in end view in FIG. 5.

Figure 7:
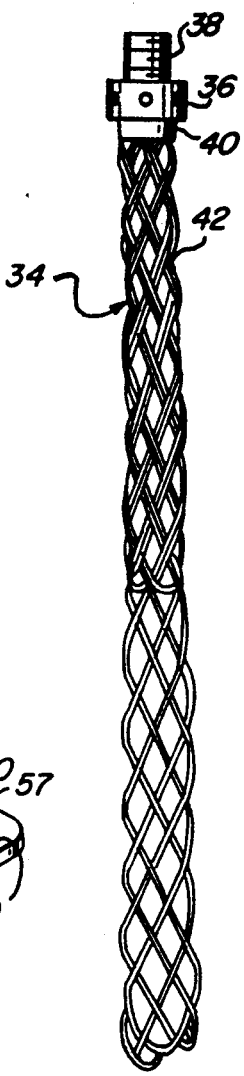
FIG. 7 is a plan view of a Kellems grip connector having a connector element at the one end and a wire mesh compression sleeve extending therefrom.

Turning next to FIG. 7, therein illustrated is a Kellems grip connector of the type which is used in the present invention and which is generally designated by the numeral 34. The connector element 36 has a threaded barrel portion 38 which will mate with and be threadably engaged with another connector element (not shown) and a collar portion 40 in which there is engaged one end of the compression sleeve 42 of interlaced wires forming an open mesh. The portion of the sleeve 42 adjacent the connector is formed by double wires to increase its strength whereas the remote portion is of single wire mesh construction. As is customary, the cable 10 will extend through the sleeve 42 and the dielectric resin coating 22 will be engaged in the connector element 36. In FIGS. 6 and 8-10, there is illustrated a jig for facilitating the making of the connection of the present invention. It is comprised of a first plate 44 having a central aperture 46 and a pair of outwardly spaced apertures 48 through which the elongated threaded fasteners 50 extend.

A second plate generally designated by the numeral 52 is formed from a generally U-shaped element 53 with a body portion 54 and a pair of legs 56 of lesser thickness than the body portion 54. Cooperating with the U-shaped element 53 is a second element 57 of generally T-shaped cross section provided by a relatively thick center rail 58 which slides between the legs 56 and the wings 60 which slide on the surface of the legs 56.

The adjacent edges of the two elements 53, 57 are formed with semi-circular recesses 62 which mate to provide a circular aperture through the plate 52 when assembled, and the elements 53,57 also have aligned arcuate grooves 64 in their inner faces which mate when assembled to define a circular channel about the cylindrical aperture. Adjacent their outer ends, the elements 53, 57 have threaded apertures 66 which are aligned with the apertures 48 in the first plate 44. The legs 56 have apertures 68 therein which are aligned with the threaded apertures 70 in the wings 60 when the two elements 53,57 are assembled to seat the short threaded fasteners 72 and thereby lock the elements 53,57 in assembly.

Figure 8:
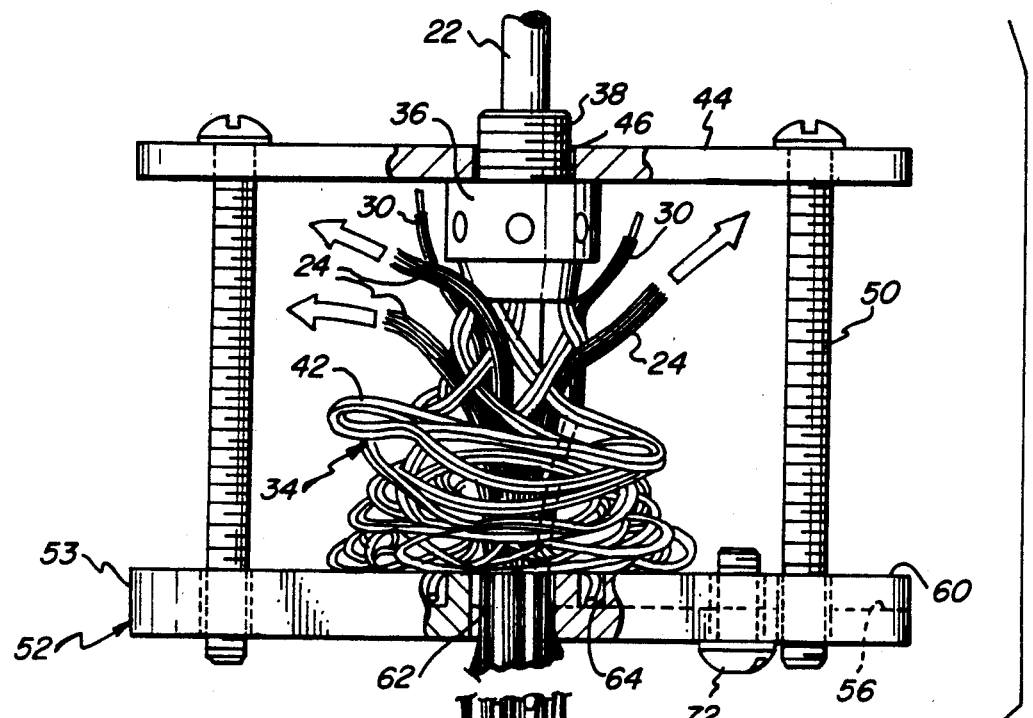
FIG. 8 is a partially diagrammatic view showing the cable of FIG. 4 and Kellems grip connector FIG. 7 assembled in the jig of FIG. 6 with the sleeve collapsed longitudinally, and diagrammatically showing the bundles being pulled therethrough.
Figure 9:
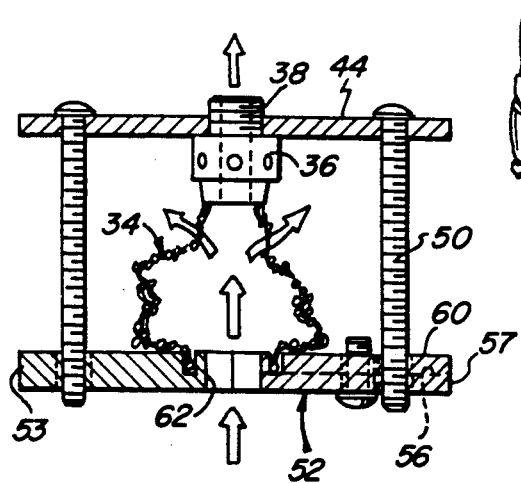
FIG. 9 is a diagrammatic view of the Kellems grip sleeve as expanded by longitudinal collapsing thereof.
Figure 10:
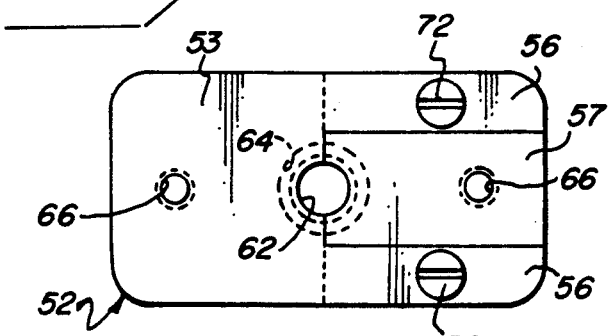
FIG. 10 is an end elevational view of the jig of FIGS. 6, 8 and 9.

In use of the jig, the Kellems grip connector is placed between the plates 44 and 52. The end of the sleeve 42 is seated in the grooves 64 in the inner face of the second plate 52. The connector element 38 is moved towards the first plate 44, and this movement causes the sleeve 42 to collapse axially and expand radially as seen in FIGS. 8 and 9.

The first plate 44 is fitted onto the connector 34 so that the barrel portion 38 of the element 36 extends through the aperture 46. The fasteners 50 are inserted through the apertures 48 and threaded into the apertures 66 of the second plate 52 to hold the jig in assembly and the sleeve 42 in its radially expanded condition.

The bundles 24 are unfolded to extend axially about the washer 28 and along the dielectric 22 in peripherally spaced relationship, and the hook up wires 30 are also extended in diametrically spaced relationship. This subassembly is then inserted through the circular aperture formed by the semicircular recesses 62 in the elements 53 and 57 and through the open end of the sleeve 42 of the Kellems grip connector 34. Using a forceps, a hook element or any other suitable tool (not shown), the hook up wires 30 are pulled through the sleeve 42 to the collar portion 40 and outwardly of the sleeve 42 through openings in its mesh. Similarly, the bundles 24 are pulled through the sleeve 42 and outwardly through openings in the mesh adjacent the collar portion 40.

The fasteners 50 may now be removed to allow the sleeve 42 to return to its normal length and the first plate 44 is removed. The screws 72 are removed, and the T-shaped element 57 slid away from the U-shaped element 53 to allow the assembly of the cable 10 and connector 34 to be removed from the jig.

Figures 11, 12, 13, 14, 15:
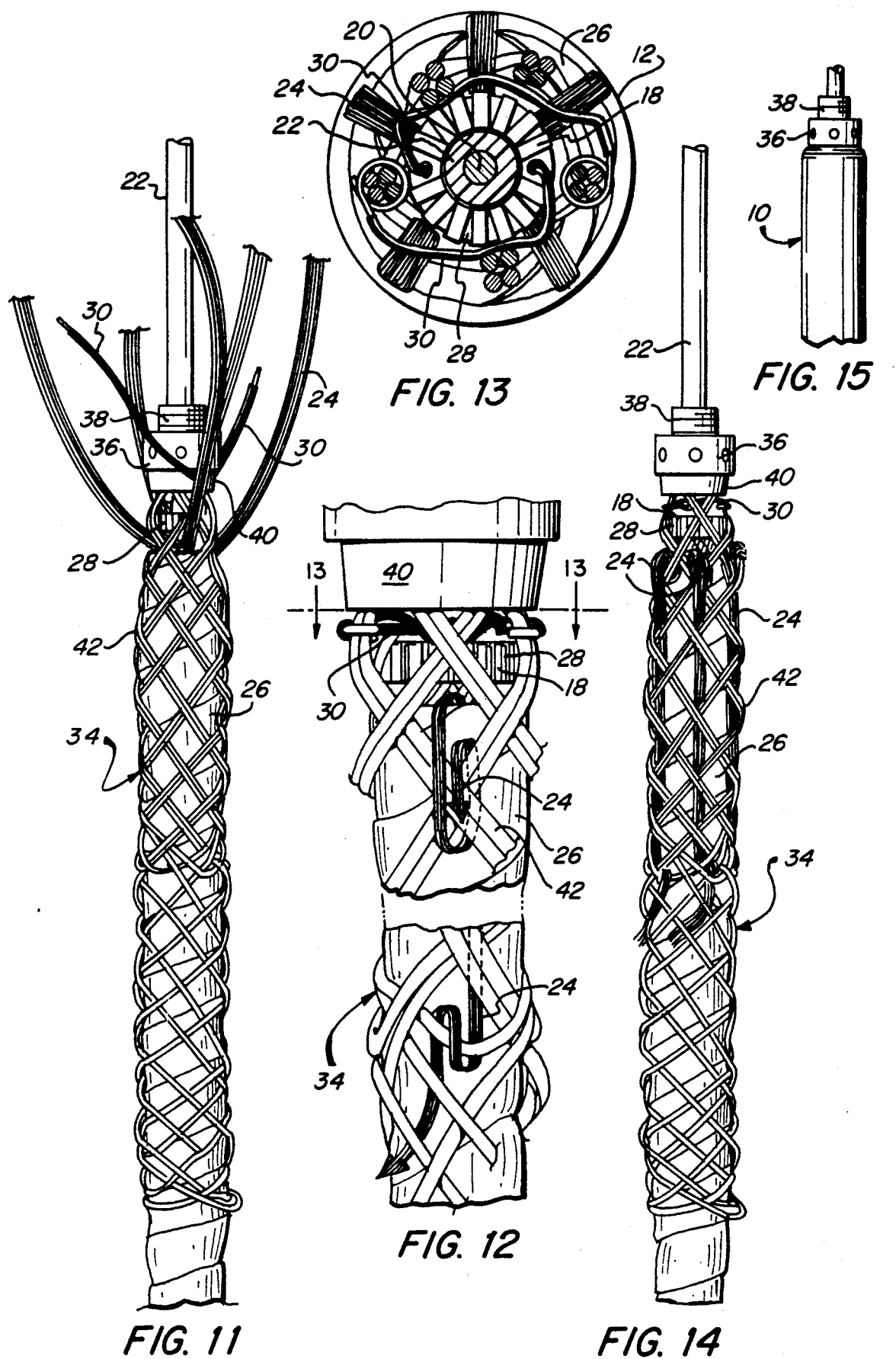
FIG. 11 shows the uncollapsed Kellems grip sleeve extending over the wrapped core, and the bundles of reinforcing strands extending outwardly through openings in the mesh of the Kellems grip sleeve.
FIG. 12 is a fragmentary plan view to an enlarged scale of the cable end showing the strand bundles as they are diagrammatically looped about and fed under the sleeve and also showing the hook up wires of the conductive washer bonded to the mesh sleeve of the connector.
FIG. 13 is a sectional view thereof to an enlarged scale along the line 13—13 of FIG. 12.
FIG. 14 is a fragmentary plan view of the connector prior to covering and molding.
FIG. 15 is a view of the covered and molded connection.

As best seen in FIGS. 12 and 13, the hook up wires 30 are looped inside about the sleeve 42 approximately 180 degrees and soldered to the wires of the sleeve 42, before the looping of the bundles 24. The resultant structure is illustrated in FIGS. 12-14.

With the sleeve 42 extended but not tensioned as seen in FIG. 11, the Kellems grip connector 34 is moved over the cable 10 until its connector element 36 is closely spaced to the washer 28 and the sleeve 42 extends over the taped portion of the cable. The bundles 24 are looped about the intersections of the wires of the mesh in the sleeve 42 in the manner diagrammatically shown in FIG. 12 and are led under the sleeve 42 away from the connector element 36. The bundles 24 are then looped about the wires of the sleeve 42 and led under the sleeve for two wire intersections, after which the excess length is cut.

Following this step, thermoplastic resin tape 26 is wrapped around the sleeve 42 to a diameter slightly greater than the outer diameter of the outer sheath 12. The wrapped cable end is then placed in a mold (not shown) and heat and pressure are applied to cause the resin of the tape 26 to melt flow into a continuous sheath extending from (and bonded to) the original sheath 12 to the connector element 36. The resultant cable end is seen in FIG. 15.

As will be readily appreciated, the encasing resin for the connector to form the continuous outer sheath may be provided by the tape as shown and described, by a sleeve, by liquid resin formulations, or the like. The material employed should be one which may be molded easily to provide the continuation of the outer sheath, and exhibit good resistance to the environment. Polyolefins and particularly polyethylene foam materials have been found quite satisfactory. In addition, a synthetic resin washer is desirably interposed between the metallic washer and the bundles to provide insulation from the heat used during the soldering operation.

It will be understood that many additional changes in the details, materials, steps and arrangement of part, which have been herein described and illustrated in order to explain the nature of the invention, may be made by those skilled in the art within the principle and scope of the invention as expressed in the appended claims.

Thus, it can be seen from the foregoing detailed specification that the method of the present invention provides a connection which has high strength and exhibits desirable electrical properties. The shielding of the braid is effectively preserved in the joint area, and the connections will have a long life under normal conditions.

What is claimed is:

1. In the method of assembling a grip connector onto a coaxial cable, the steps comprising:
   selecting a coaxial cable having a conductive core, a dielectric coating thereover, a metallic braid thereabout, synthetic resin reinforcing strands outwardly of said braid, and an outer sheath;
   removing a length of the outer sheath from an end portion of said cable to be provided with the connector, to expose said metallic braid and said reinforcing strands;
   forming said exposed strands into a multiplicity of bundles spaced about the periphery of said metallic braid and folding said bundles upon themselves to extend away from said end of said cable;
   placing a metallic washer over said exposed metallic braid and conductively bonding said metallic braid thereto;
   sliding over said cable end a grip connector having a connector element at its outer end and a cylindrical mesh compression sleeve formed by interlaced wires, said mesh sleeve extending over said washer and said bundles of strands;
   feeding said bundles of reinforcing strands outwardly through peripherally spaced openings in said mesh sleeve adjacent said connector element;
   looping each one of said bundles about a peripherally spaced intersection of the wires of said mesh sleeve and feeding each axially under said mesh sleeve towards the end thereof spaced from said connector element; and
   looping each one of said bundles about a peripherally spaced wire of said mesh sleeve adjacent said spaced end thereof, whereby said bundles of reinforcing strands are firmly interengaged with said mesh sleeve of said grip connector.

2. The method of assembling a grip connector in accordance with claim 1 wherein said mesh sleeve is initially collapsed in length to effect an expansion in diameter and permit feeding said bundles therethrough.

3. The method of assembling a grip connector in accordance with claim 2 wherein said mesh sleeve is comprised of a first section with double wires along its length adjacent said connector element and a second section of single wires adjacent its other end and wherein said second looping step is effected adjacent the inner end of said second section.

4. The method of assembling a grip connector in accordance with claim 2 wherein said sleeve is released from its collapsed condition after said bundles are fed therethrough.

5. The method of assembling a grip connector in accordance with claim 1 wherein said strands are formed into five bundles and said wire mesh sleeve has five intersections of wires about its periphery.

6. The method of assembling a grip connector in accordance with claim 1 wherein there is included the step of forming an insulating covering about said exposed braid beginning at a point spaced inwardly from the outer ends thereof and continuing to said outer sheath.

7. The method of assembling a grip connector in accordance with claim 6 wherein said insulating covering is formed from a thermoplastic resin.

8. The method of assembling a grip connector in accordance with claim 7 wherein there are included the steps of covering said mesh sleeve of said grip connector and said reinforcing strands with a thermoplastic material and then molding said insulating covering and thermoplastic material into a continuous insulating sheath extending from said outer sheath to said connector element.

9. The method of assembling a grip connector in accordance with claim 1 wherein said washer has hook up wires thereon extending towards the end of said cable and wherein there is included the step of conductively connecting said hook up wires to said connector.

10. In a coaxial cable connection, the combination comprising:

a coaxial cable having a conductive core, a dielectric coating thereover, a metallic braid thereabout, synthetic resin reinforcing strands outwardly of said braid, and an outer sheath, said cable having an end portion from which said outer sheath has been stripped;

a conductive washer on said end portion of said braid spaced inwardly from the end of said cable, said braid being conductively coupled to said washer; and a grip connector having a connector element at said end of said cable engaged with said dielectric coating and a cylindrical mesh compression sleeve formed by interlaced wires, the portion of said reinforcing strands adjacent said cable being formed into a multiplicity of peripherally spaced bundles extending axially towards and then away from said washer and under said sleeve, said bundles being looped about intersections of the wire mesh adjacent said connector element and then extending axially away from said connector elements, said bundles also being looped about said wire mesh at points spaced from said washer.

11. The cable connection in accordance with claim 10 wherein said mesh sleeve is comprised of a first section with double wires adjacent said connector element and a second section of single wires spaced therefrom.

12. The cable connection in accordance with claim 11 wherein said strands are formed into five bundles and said mesh sleeve has five intersections of wires about its periphery.

13. The cable connection in accordance with claim 10 wherein said washer has a pair of hook up wires thereon conductively bonded to said mesh sleeve adjacent said connector element.

* * * * *